(12) United States Patent
Arcens

(10) Patent No.: US 8,548,462 B2
(45) Date of Patent: Oct. 1, 2013

(54) USER EQUIPMENT CELLULAR IDENTIFICATION

(75) Inventor: Suzanne Arcens, Dusseldorf (DE)

(73) Assignee: QUALCOMM Incorporated, San Diego, CA (US)

( * ) Notice: Subject to any disclaimer, the term of this patent is extended or adjusted under 35 U.S.C. 154(b) by 1566 days.

(21) Appl. No.: 11/244,485

(22) Filed: Oct. 5, 2005

(65) Prior Publication Data

US 2006/0128383 A1 Jun. 15, 2006

Related U.S. Application Data

(60) Provisional application No. 60/620,458, filed on Oct. 19, 2004.

(51) Int. Cl.
*H04W 4/00* (2009.01)

(52) U.S. Cl.
USPC .................................. 455/432.3; 455/404.2

(58) Field of Classification Search
USPC .............. 455/433, 432.3, 404.2, 11.1, 456.1, 455/500, 517, 403, 13.4, 411; 370/333, 332, 370/390, 516
See application file for complete search history.

(56) References Cited

U.S. PATENT DOCUMENTS

| | | | |
|---|---|---|---|
| 6,169,899 B1 | 1/2001 | Havinis et al. | 455/433 |
| 6,385,452 B1 * | 5/2002 | Zadeh et al. | 455/440 |
| 6,757,518 B2 * | 6/2004 | Spratt et al. | 455/11.1 |
| 7,092,410 B2 * | 8/2006 | Bordonaro et al. | 370/516 |
| 2002/0187782 A1 * | 12/2002 | Spratt | 455/435 |
| 2004/0048597 A1 * | 3/2004 | Khushu et al. | 455/404.2 |
| 2005/0070296 A1 * | 3/2005 | Maanoja | 455/456.1 |

FOREIGN PATENT DOCUMENTS

| | | |
|---|---|---|
| EP | 1267541 | 5/2002 |
| EP | 1311135 | 11/2002 |
| FR | 2729812 | 1/1996 |
| WO | 2004016027 | 2/2004 |

OTHER PUBLICATIONS

International Search Report and Written Opinion—PCT/US2005/037902, International Search Authority—European Patent Office—Jun. 3, 2006.

* cited by examiner

*Primary Examiner* — Charles Appiah
*Assistant Examiner* — Alexander Yi
(74) *Attorney, Agent, or Firm* — Howard Seo

(57) ABSTRACT

A method and apparatus for determining user equipment cell identification examines the age of the cell identification known to the user equipment when determining whether to use that cell identification or to obtain the cell identification through alternate means. The age of the cell identification known to the user equipment is examined by the user equipment, the communication system, or both by comparing the age to a predefined value. The age indicator can be transmitted by the user equipment to a network. If the age exceeds a predefined value, then the cell identification is obtained through network procedures. If the age is less than a predefined value then the cell identification known to the user equipment is accepted as current. Position information for the user equipment can be based upon the cell identification known to the user equipment or as obtained through network procedures.

25 Claims, 4 Drawing Sheets

USER EQUIPMENT CELLULAR IDENTIFICATION

RELATED APPLICATIONS

This application claims priority to U.S. Provisional Application No. 60/620,458, filed on Oct. 19, 2004.

BACKGROUND

1. Field of the Invention

The present method and apparatus relates generally to positioning systems for wireless user equipment, and more specifically to a wireless system that examines user equipment cellular identification and cellular identification age.

2. Relevant Background

Accurate position information of user equipment (UE) such as cellular telephones, personal communication system (PCS) devices, and other mobile stations (MSs) is becoming prevalent in the communications industry. Global Positioning Systems (GPS) offer an approach to providing wireless UE position determination. GPS employs satellite vehicles (SVs) in orbit around the earth that transmit positioning signals. A UE equipped with a GPS receiver can derive precise navigation information including three-dimensional position, velocity and time of day through information gained from the SV transmissions.

One disadvantage of the GPS system for location determination is the relatively long time needed to perform signal acquisition under certain conditions. SV signals cannot be tracked until they have first been located by searching in a two-dimensional search "space", whose dimensions are code-phase delay and observed Doppler frequency shift. Typically, if there is no prior knowledge of a signal's location within this search space, as would be the case after a receiver "cold start", a large number of code delays and frequencies must be searched for each SV signal that is to be acquired and tracked. These locations are examined sequentially, a process that can take several minutes in a conventional GPS receiver.

In order to reduce this delay, information may be provided to aid a GPS receiver in acquiring a particular signal. Such assistance information permits a receiver to narrow the search space that must be searched in order to locate a signal, by providing bounds on the code and frequency dimensions. The predicted code window provides a reduced range within which the "code phase" (effectively, the signal time of arrival, or "pseudorange") should be found, or a predicted range of observed Doppler shift associated with the signal. Narrower code and frequency windows reduce the overall search space resulting in a reduction in the time in which the receiver takes to acquire the signal. A system that employs a GPS receiver augmented with externally sourced GPS assistance data is commonly referred to as an "assisted global positioning system" (AGPS).

The goal of GPS position assistance information is to permit the UE to predict the time of arrival, or code phase, of a particular SV signal, and the Doppler shift of the SV signal. If the UE is provided with an initial reference position that is within an area of predefined size, such as a particular cellular coverage, then the total search space can be reduced to that consistent with the predefined size.

One example of an AGPS system is wireless UE with GPS capabilities in communication with one or more base stations (BSs), also referred to as base transmitting stations (BTSs), or node Bs, which in turn communicate with one or more servers, also called Position Determination Entities (PDEs) or Serving Mobile Location Centers (SMLCs) depending upon the communication air interface protocol. The PDE derives GPS assistance information from one or more GPS reference receivers.

The PDE has access to a means of determining the approximate UE position. This might consist of a "base station almanac" (BSA) that provides BTS/node B location based upon a serving cell identification (ID) reported by the UE. The BSA provides the approximate location of the UE by providing the geographical coordinates for a reference position based upon the unique serving cell ID, while the PDE computes the signal acquisition assistance information customized for the approximate UE position. Alternatively, this information may be derived via network procedures and Mobile Application Part (MAP) standards, such as via an Any Time Interrogation (ATI) request by the network to the "home location registry" (HLR) associated with the UE. The HLR is a database that stores user subscription and identity information. In that instance, the network obtains the cell ID through network procedures such as submission of an ATI request that may contain the international mobile equipment identity (IMSI) or mobile station integrated services digital network (MSISDN) identification for the UE.

The cell ID is extracted by the UE from periodically broadcast system information messages from the BTS. However, during lengthy communications when changing cells or base stations the UE does not necessarily retrieve the cell ID of subsequent BTSs, but instead retains the cell ID of the BTS to which the UE connected during power-up. Thus the cell ID "ages" during communication. For more rapid identification purposes, when a UE is handed off to a subsequent BTS, the smaller, locally-unambiguous BSIC identifier—in GSM protocol, or PSC identifier—in UMTS protocol, along with the carrier frequency is accessed by the UE. When the cell ID known to the UE has aged, UE position uncertainty increases. If the age of the cell ID known to the UE is relatively young, then the cell ID is likely accurate and position is more certain.

Another limitation of obtaining a cell ID for the purpose of providing position assistance information to the UE occurs when network-based procedures are used to obtain cell ID, such as when the network initiates an ATI request to the HLR. This process requires valuable network resources to obtain the cell ID when instead the UE may be capable of providing current cell information, particularly if the cell ID age is young.

A need exists for a method and apparatus that optimizes network resources by reducing dependence upon frequent network-initiated ATI procedures to obtain a UE cell ID when a current cell ID may be available from the UE itself. The current cell ID can then be used in determining UE position information.

SUMMARY

A method of determining user equipment cell identification in a communication system includes receiving the cell identification with user equipment, tracking the cell identification age with the user equipment after the cell identification has been received, and transmitting the cell identification and cell identification age from the user equipment. By comparing the cell identification age to a predefined value, the user equipment, or a network, can determine whether the cell identification known to the user equipment is still current. If the cell identification known to the user equipment is not current, then cell identification can be obtained through alternative network procedures. Advantageously, if the cell identification known to the user equipment is current, then the cell identification known to the user equipment can be used by the network. Position information for the user equipment is based upon the cell identification, as known to the user equipment or as obtained through alternative network procedures.

The apparatus described herein includes means for receiving the cell identification, means for tracking the age of the cell identification after receiving it, and means for transmitting the cell identification and cell identification age from the user equipment. Means for comparing cell identification age to a predefined value is also optionally included in the apparatus.

DRAWINGS

Embodiments of the disclosed method and apparatus are shown in the following figures, in which like reference numbers and designations indicate like or similar parts.

Figure 3:
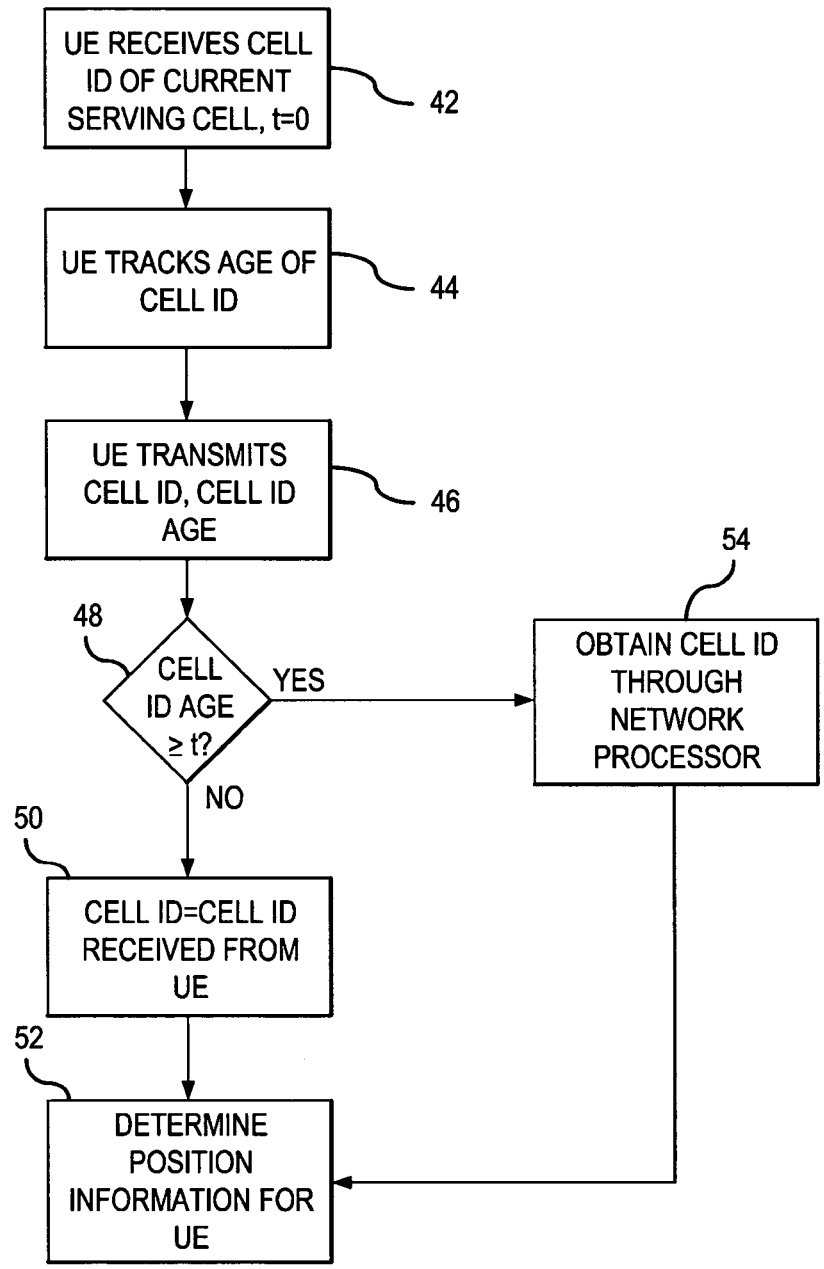
Figure 4:
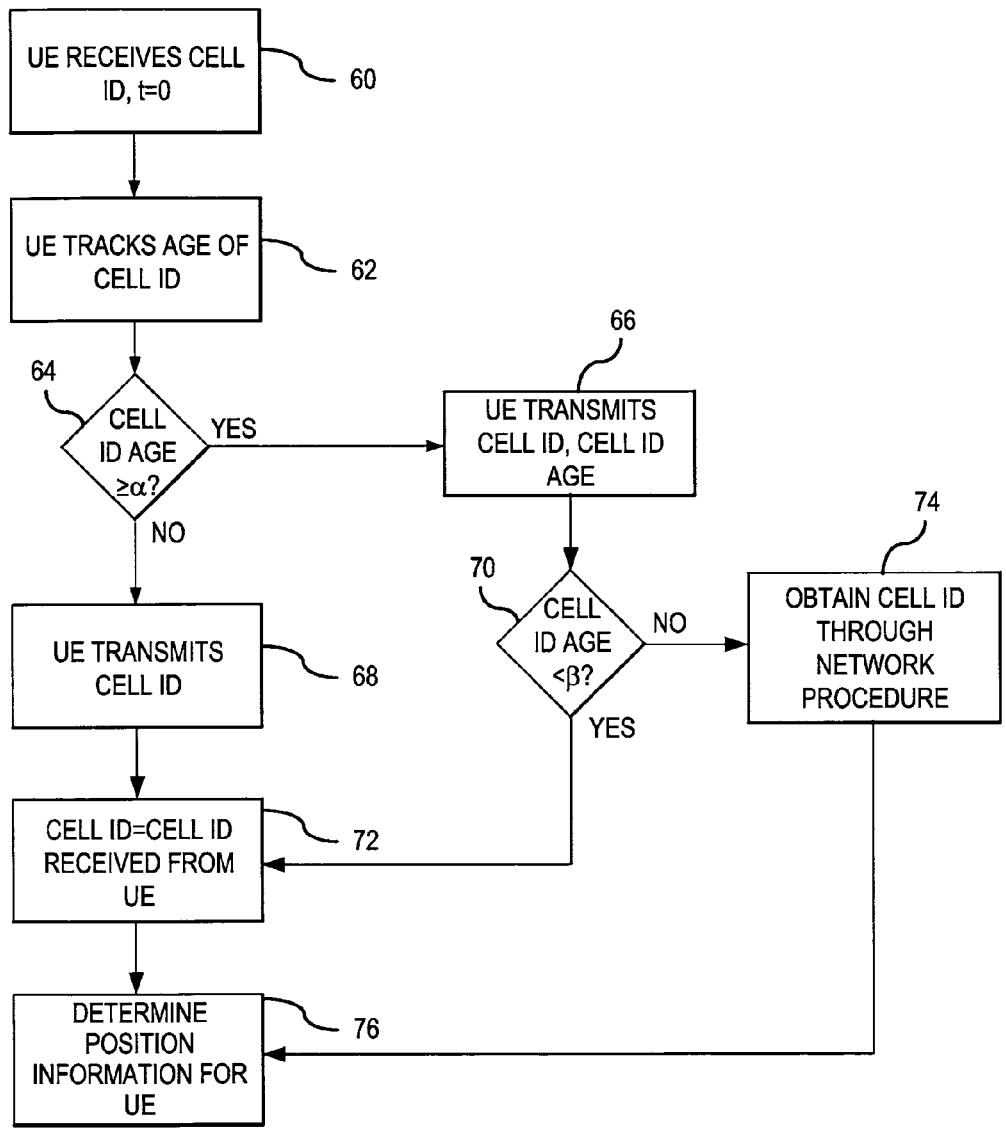

FIG. 3 outlines a method of determining current UE cell ID in order to determine UE position information; and FIG. 4 outlines a method of determining current UE cell ID in order to determine UE position information.

DETAILED DESCRIPTION

The method and apparatus described herein is applicable for communication systems, such as but not limited to wireless position location systems that acquire and utilize global positioning system satellite vehicle signals as well as those that use acquisition assistance data, such as AGPS systems. It will be understood by those skilled in the art that the method and apparatus herein may be employed in any communication air interface protocol, such as but not limited to, UMTS, GSM, code division multiple access (CDMA), and wideband CDMA (WCDMA).

The term "computer" is used herein to refer generally to a programmable apparatus or terminal in communication with a programmable apparatus, programmable wireless handheld device such as a mobile station, user equipment, or server such as a PDE, having a processor or other equivalent hardware, as well known by those skilled in the art. The term "user equipment" is used herein to describe any type of equipment with communication capability and a receiver and is not to be limited to any particular type of hardware. Each "computer", "mobile station", or "user equipment" referred to herein includes the necessary "computer-readable" media to perform the functions described herein, or is in communication with the necessary computer-readable media. The term "computer-readable medium" refers to any medium that participates in providing instructions to a processor for execution. The singular "medium" is defined herein to include the plural "media".

"Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media. The term "data" as used herein refers to information.

It will be understood as used herein that the microprocessor can, but need not necessarily include, one or more microprocessors, embedded processors, controllers, application specific integrated circuits (ASICs), digital signal processors (DSPs), and the like. The term microprocessor is intended to describe the functions implemented rather than specific hardware. As used herein the term "memory" refers to any type of long term, short term, or other memory associated with the computer or other described device, and is not to be limited to any particular type of memory or number of memories, or type of media upon which memory is stored.

Each BTS in the world in Global System for Mobile Communication (GSM), Universal Mobile Telecommunications System (UMTS), and General Packet Radio Service (GPRS) protocols is uniquely identified by a cell ID or "Cell Global Identity." The 3GPP TS 23.003 standard defines "Cell Global Identity" as consisting of the three-digit MCC+the two or three digit MNC+two byte LAC+2 byte CI, where MCC refers to mobile country code, MNC refers to mobile network code, LAC refers to location area code, and CI refers to cell identity. Although the definition of "Cell Global Identity" is currently in use and serves the purpose of the "cell ID" referred to herein, it will be apparent to those of skill in the art that a "cell ID" need not be defined in precisely the manner of the 3GPP TS standard; an endless variety of components could make up a unique cell ID and still function in the same way to produce the same result as that described in the present method and apparatus.

Figure 1:
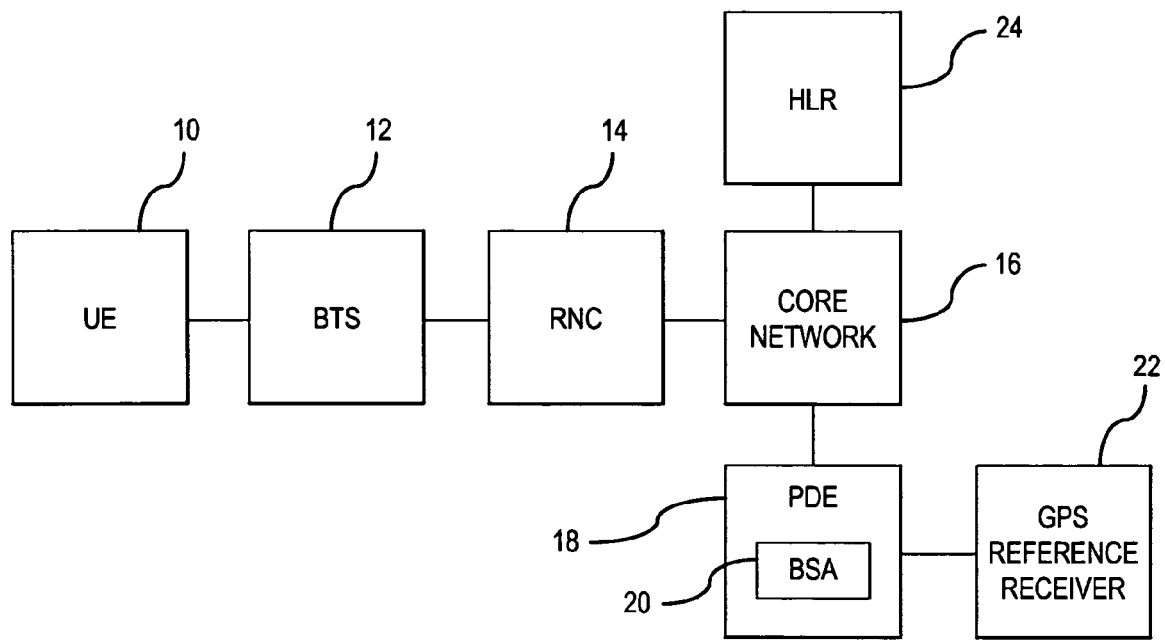
FIG. 1 illustrates an overview of communication amongst a user equipment device, base transmitting station, radio network controller, and core network.

With reference to FIG. 1, a diagram illustrates an example of a UE 10 with GPS capabilities communicating with a serving base station 12, or base transmitting station (BTS) in GSM protocol, or "node B" in UMTS protocol. The UE 10 is communicating with the BTS 12 because UE 10 is located in the coverage area of the BTS 12. Base transmitting station 12 communicates with a radio network controller (RNC) 14, which is a server or computer responsible for controlling the use and integrity of the radio resources, which in turn communicates with a core network (CN) 16 having one or more computers and/or servers. A position server or computer, or position determination entity (PDE), 18 communicates with the core network to provide position determination assistance to a UE. The PDE 18 stores a base station almanac (BSA) 20 that contains reference positions for user equipment and in the case of the CDMA air interface, time delay calibration estimates. The PDE also maintains a local database of satellite orbit almanac, clock and ephemeris information, ionosphere information, and satellite working condition ("health") information. Some of this information is customized for the approximate location of the UE. This is determined by the BSA using the UE's cellular identification. A GPS reference receiver, or world area reference network (WARN), 22 provides reference SV information to the PDE 18. An HLR 24 provides user subscription and identity information, including cell ID, to the network upon network request.

Figure 2:
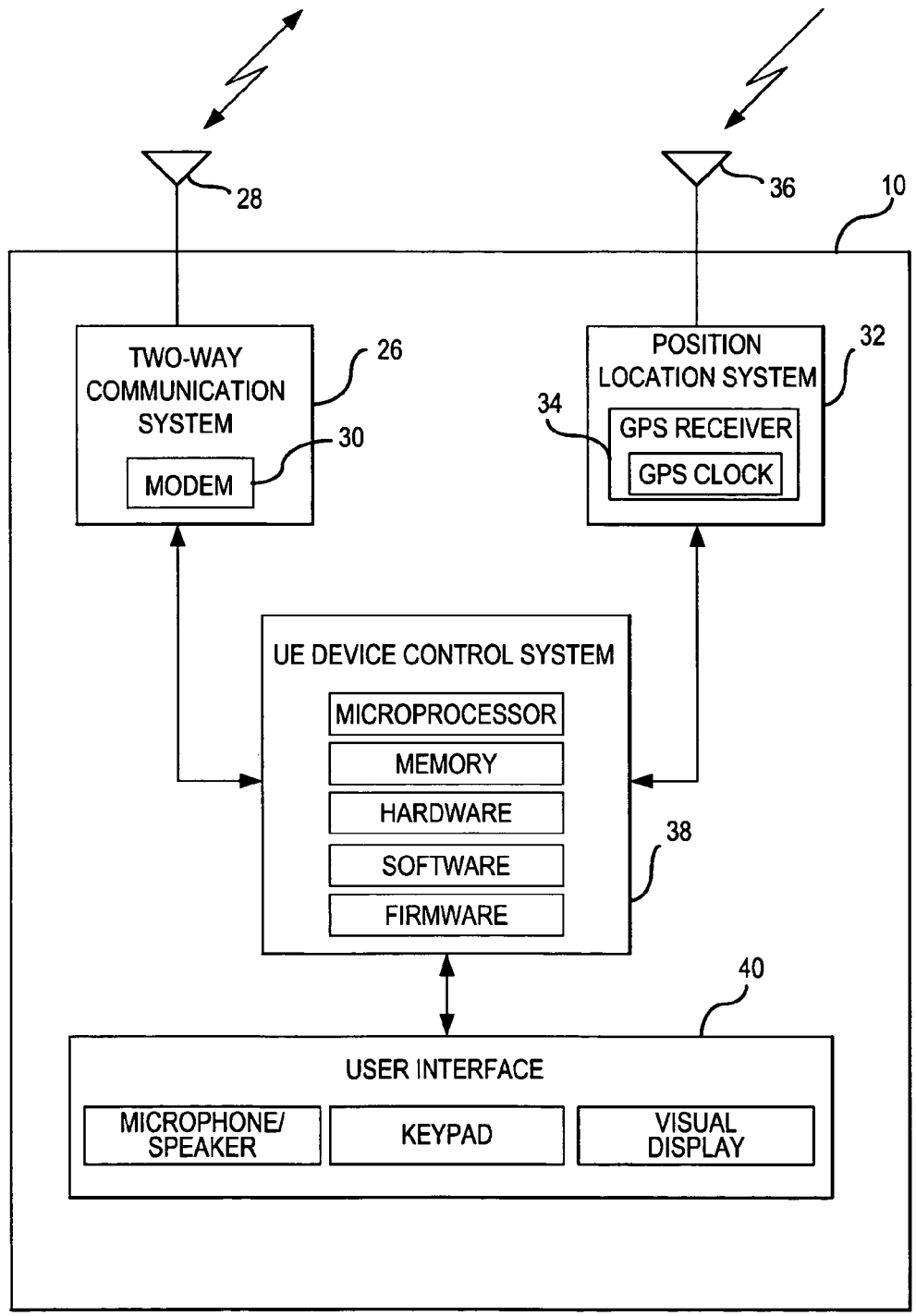
FIG. 2 illustrates a typical user equipment device with position location capabilities.

Referring to FIG. 2, a diagram illustrates components of the UE 10 depicted in FIG. 1. The UE 10 includes a two-way communication system 26, such as but not limited to a cellular communication system, which transmits and receives signals via antenna 28. The communication system includes modem 30, such as a UMTS, CDMA, or GSM modem. User equipment 10 includes a position location system 32, such as a Global Positioning System having a GPS receiver 34 that receives SV signals via antenna 36. The modem 30 and GPS receiver 34 communicate with one another, and the UE cellular identification, frequency, and other radio information is shared between the two. Control 38 is provided by a microprocessor and associated memory, hardware, software, and firmware. A user interface 40 allows a user to enter information into and receive information from UE 10.

Before a UE 10 obtains its position, via UE-based or UE-assisted GPS, or any other positioning method, the only relevant data that the UE possesses is its UE cellular identification, hereafter "cell ID," that the UE extracted from system information messages broadcast from the BTS 12 (FIG. 1) and received by the UE receiver. The core network 16 may obtain the current cell ID from the UE, or by network procedures, such as but not limited to, submitting an any time interrogation (ATI) to the home location register (HLR).

FIG. 3 outlines a method of determining current UE cell ID in order to determine UE position information. Initially at time t=0, the UE receives its cell ID for the current serving cell from periodically broadcast system information messages 42. The means for receiving cell ID include the receiving antenna 28 (FIG. 2) and two-way communication system 26 of the UE 10. From that point in time forward, the UE tracks the age of the received cell ID 44. After the UE has received the cell ID, the UE may travel geographically, either within the same serving cell or to another serving cell, or remain in a static position, while the cell ID age is tracked. The means for tracking cell identification age after receiving include the UE device control system 38. The age of the cell ID is tracked by a suitable routine or routines operating in the UE device control.

When in communication with the network, the UE transmits cell information including a field that indicates the age of the cell ID to the network 46. The cell ID age is equal to the time difference between the time that the cell ID is transmitted from the UE to the network, and the time, t=0, that the UE received the cell ID. It will be apparent to those skilled in the art that an indication of cell ID age can be in the form of a variety of different data types or modes of communication of data. Cell ID age is not to be limited to a numerical value, nor are the predefined age values to which cell ID age is compared, as described below. The means for transmitting cell ID and cell ID age include the two-way communication system 26 and antenna 28 (FIG. 2).

When the network next requires cell ID for purposes of determining position information for the UE, or for any other purpose, the network examines the age of the cell ID, via suitable instruction operating on a computer, processor, server, or other appropriate mechanism, last received from the UE to determine if it exceeds a predefined value ($\theta$) 48. For example, $\theta$ may range between approximately 3 seconds and approximately 60 seconds. However, it will be apparent to those skilled in the art that $\theta$ may be set to any amount of time. The network is thus making an a posteriori decision about the cell ID based upon knowledge of the quality of the cell information. If the received cell ID age is less than a predefined value, then the network accepts the cell ID received from the UE as the current cell ID 50. The system then determines position information for the UE based upon that particular cell ID 52. If the received cell ID age is greater than or equal to the predefined value, then the network obtains the most current cell ID through alternative network procedures 54. For example, the network may request an ATI to the HLR using ATI and MAP standards, such as defined in the 3GPP TS 29.002, 23.018, and 23.078 standards. The network then determines position information for the UE based upon the cell ID obtained through the network procedures 52.

Referring to FIG. 4, a diagram outlines another method of determining current UE cell ID in order to determine UE position information. Initially at time t=0, the UE receives its cell ID for the current serving cell from periodically broadcast system information messages 60. From that point in time forward, the UE tracks the age of the received cell ID 62. When preparing the cellular information message to be transmitted to the network, the UE examines the age of the known cell ID 64. If the cell ID age is greater than or equal to a predefined value ($\forall$) then the UE transmits cell information including a field that indicates the age of the cell ID to the network 66. The means for comparing cell ID age to a predefined value include the UE device control system 38 (FIG. 2). As an example, $\forall$ may range between approximately 3 seconds and approximately 60 seconds. However, it will be apparent to those skilled in the art that $\forall$ may be set to any amount of time. The cell ID age is equal to the time difference between the time that the cell ID is transmitted from the UE to the network and the time, t=0, that the UE received the cell ID. If the cell ID age is less than a predefined value ($\forall$), the UE transmits the cellular information with the cell ID to the network without the cell ID age field 68.

When the network next requires cell ID for purposes of determining position information for the UE, or for any other purpose, the network examines the age of the cell ID last received from the UE, if the case where cell ID age was transmitted by the UE, to determine if it exceeds a predefined value ($\exists$) 70. For example, $\exists$ may range between approximately 3 seconds and approximately 60 seconds. However, it will be apparent to those skilled in the art that $\exists$ may be set to any amount of time. The network is thus making an a posteriori decision about the cell ID based upon knowledge of the quality of the cell information. If the received cell ID age is less than a predefined value $\exists$, then the network accepts the cell ID received from the UE as the current cell ID 72. The system then determines position information for the UE based upon that particular cell ID 76. If the received cell ID age is greater than or equal to the predefined value $\exists$, then the network obtains the most current cell ID through alternative network procedures 74. For example, the network may request an ATI to the HLR using ATI and MAP standards, such as defined in the 3GPP TS 29.002, 23.018, and 23.078 standards. The network then determines position information for the UE based upon the cell ID obtained through the network procedures 76.

If the UE did not transmit cell ID age information because the cell ID age, as examined by the UE, was less than the predefined value ($\forall$) 68, then the network immediately accepts the cell ID received from the UE as the current cell ID 72. Position information for the UE is then determined based upon the cell ID received from the UE 76.

The foregoing description illustrates exemplary implementations, and novel features, of a method and apparatus for determining GPS user equipment cellular identification. There are many aspects to this method and apparatus, because it may involve interaction between numerous components of a communications system. While some suggestions are provided for alternative uses and implementations of the method and apparatus, it is of course not practical to exhaustively list or describe such alternatives. Accordingly, the scope of the presented method and apparatus should be determined only by reference to the appended claims, and should not otherwise be limited by features illustrated herein except insofar as such limitation is recited in an appended claim.

While the above description has pointed out novel features of the disclosed method and apparatus, the skilled person will understand that various omissions, substitutions, and changes in the form and details of the method and apparatus illustrated may be made without departing from the scope of the invention. For example, the skilled person will be able to adapt the details described herein to communications systems having a wide range of modulation techniques, transmitter and receiver architectures, and generally any number of different formats. In particular, any system transmitter may function as a BTS for purposes of this disclosure, and need not utilize UMTS, GSM or CDMA technology, nor even be a cellular telecommunications BTS. Any transmitter may be treated similarly as SVs are treated herein, with acquisition assistance information deduced, obtained and employed to aid in the acquisition of a signal from such transmitter.

The method and apparatus uses the term "SV signal" for signals that are to be acquired or measured, because this is a common practice and is geometrically straightforward. However, any signal whose acquisition is sought may be treated as set forth for a "SV signal" of the set that is to be measured. All procedures for other signals that are to be measured, such as untracked BTS signals, are substantially similar or identical to those referenced, such that the skilled person will readily modify the calculations for such other signals without a need for explicit instructions herein. Such other signals may serve many of the same purposes as SV signals, for example for ranging and location determination, and indeed may entirely supplant SV signals if necessary.

Each practical and novel combination of the elements described hereinabove, and each practical combination of equivalents to such elements, is contemplated as an embodiment of the invention. Partly because many more element combinations are contemplated as embodiments of the invention than can reasonably be explicitly enumerated herein, the scope of the invention is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

The invention claimed is:

1. A method of determining user equipment cell identification in a communication system, the method comprising:
receiving cell identification with user equipment;
tracking cell identification age with user equipment after receiving;
comparing the cell identification age to a predefined value, wherein outcome of comparing the cell identification age to the predefined value provides information about quality of the cell identification, wherein the cell identification age continues to increase past the predefined value until a new cell identification is received; and
transmitting the cell identification and the cell identification age from the user equipment to a network,
wherein the cell identification age is the difference between the time that the cell identification is transmitted from the user equipment to the network and the time that the user equipment received the cell identification;
wherein when the cell identification age is less than the predefined value, the cell identification is used for determining position information of the user equipment, and when the cell identification age is greater than the predefined value, the new cell identification received from an ATI (Any Time Interrogation) to a HLR (home location registry) is used for determining position of the user equipment.

2. The method of claim 1 further comprising obtaining cell identification through a network procedure in response to the cell identification age is greater than the predefined value, wherein obtaining cell identification through a network procedure includes submitting an any time interrogation to a home location register.

3. The method of claim 1 further comprising accepting cell identification received from user equipment in response to the cell identification age is less than the predefined value.

4. The method of claim 2 further comprising determining position information for user equipment based upon cell identification obtained through a network procedure.

5. The method of claim 3 further comprising determining position information for user equipment based upon cell identification received from user equipment.

6. The method of claim 1 wherein comparing cell identification age to a predefined value comprises comparing cell identification age to a predefined value with at least one mechanism selected from the group consisting of user equipment and networks.

7. A method of determining user equipment cell identification in a communication system, the method comprising:
receiving cell identification with user equipment;
tracking cell identification age with user equipment after receiving;
comparing the cell identification age to a predefined value, wherein outcome of comparing the cell identification age to the predefined value provides information about quality of the cell identification, wherein the cell identification age continues to increase past the predefined value until a new cell identification is received; and
transmitting the cell identification and the cell identification age from the user equipment to a network,
wherein the cell identification age is the difference between the time that the cell identification is transmitted from the user equipment to the network and the time that the user equipment received the cell identification;
wherein when the cell identification age is less than the predefined value, the cell identification is used for determining position information of the user equipment, and when the cell identification age is greater than the predefined value, the new cell identification received from an ATI (Any Time Interrogation) to a HLR (home location registry) is used for determining position of the user equipment.

8. The method of claim 7 further comprising comparing cell identification age to a predefined value with user equipment.

9. The method of claim 8 further comprising transmitting cell identification age from user equipment according to the outcome of the comparing step.

10. The method of claim 9 further comprising comparing cell identification age to a predefined value with a network.

11. The method of claim 10 further comprising obtaining cell identification through a network procedure in response to the cell identification age is greater than the predefined value, wherein obtaining cell identification through a network procedure includes submitting an any time interrogation to a home location register.

12. The method of claim 10 further comprising accepting cell identification received from user equipment in response to the cell identification age is less than the predefined value.

13. The method of claim 11 further comprising determining position information for user equipment based upon cell identification obtained through a network procedure.

14. The method of claim 12 further comprising determining position information for user equipment based upon cell identification received from user equipment.

15. The method of claim 8 further comprising accepting cell identification received from user equipment.

16. The method of claim 15 further comprising determining position information for user equipment based upon cell identification received from user equipment.

17. An apparatus for determining user equipment cell identification in a communication system, comprising:
  user equipment comprising:
    means for receiving cell identification;
    means for tracking cell identification age after receiving;
      means for comparing the cell identification age to a predefined value, wherein outcome of comparing the cell identification age to the predefined value provides information about quality of the cell identification, wherein the cell identification age continues to increase past the predefined value until a new cell identification is received; and
      means for transmitting the cell identification and the cell identification age to a network,
      wherein the cell identification age is the difference between the time that the cell identification is transmitted from the user equipment to the network and the time that the user equipment received the cell identification;
      wherein when the cell identification age is less than the predefined value, the cell identification is used for determining position information of the user equipment, and when the cell identification age is greater than the predefined value, the new cell identification received from an ATI (Any Time Interrogation) to a HLR (home location registry) is used for determining position of the user equipment.

18. The apparatus of claim 17 further comprising means for transmitting cell identification age.

19. A computer readable medium tangibly embodying instructions for performing the steps of:
  comparing a cell identification age to a predefined value at a network, wherein outcome of comparing the cell identification age to the predefined value provides information about quality of cell identification, wherein the cell identification age continues to increase past the predefined value until a new cell identification is received; and
  according to the outcome of the comparing step, obtaining the cell identification through a network procedure in response to the cell identification age is greater than the predefined value or accepting cell identification received from user equipment in response to the cell identification age is less than the predefined value,
  wherein the cell identification age is the difference between the time that the cell identification is transmitted from the user equipment to the network and the time that the user equipment received the cell identification;
  wherein when the cell identification age is less than the predefined value, the cell identification is used for determining position information of the user equipment, and when the cell identification age is greater than the predefined value, the new cell identification received from an ATI (Any Time Interrogation) to a HLR (home location registry) is used for determining position of the user equipment.

20. The computer readable medium of claim 19 tangibly embodying instructions for determining position information for user equipment based upon cell identification obtained through a network procedure.

21. The computer readable medium of claim 19 tangibly embodying instructions for determining position information for user equipment based upon cell identification received from user equipment.

22. A user equipment, comprising:
  a two way communication system configured to transmit and receive signals via a first antenna;
  a position location system configured to receive satellite vehicle signals via a second antenna;
  a device control system, wherein the device control system includes control logic configured to receive cell identification, track cell identification age after receiving, compare the cell identification age to a predefined value, wherein outcome of comparing the cell identification age to the predefined value provides information about quality of the cell identification, wherein the cell identification age continues to increase past the predefined value until a new cell identification is received, and transmit cell identification and the cell identification age to a network,
  wherein the cell identification age is the difference between the time that the cell identification is transmitted from the user equipment to the network and the time that the user equipment received the cell identification;
  wherein when the cell identification age is less than the predefined value, the cell identification is used for determining position information of the user equipment, and when the cell identification age is greater than the predefined value, the new cell identification received from an ATI (Any Time Interrogation) to a HLR (home location registry) is used for determining position of the user equipment.

23. The user equipment of claim 22 further comprises control logic configured to obtain cell identification through a network procedure in response to the cell identification age is greater than the predefined value, wherein the control logic configured to obtain cell identification through a network procedure includes control logic configured to submit an any time interrogation to a home location register.

24. The user equipment of claim 22 further comprises control logic configured to accept cell identification in response to the cell identification age is less than the predefined value.

25. The user equipment of claim 23 further comprises control logic configured to determine position information based upon cell identification obtained through a network procedure.

* * * * *